United States Patent
Yoo et al.

(10) Patent No.: US 7,778,522 B2
(45) Date of Patent: Aug. 17, 2010

(54) RECORDING MEDIUM HAVING A DATA STRUCTURE FOR MANAGING GRAPHIC INFORMATION AND RECORDING AND REPRODUCING METHODS AND APPARATUSES

(75) Inventors: Jea Yong Yoo, Seoul (KR); Kang Soo Seo, Anyang-si (KR); Byung Jin Kim, Seongnam-si (KR); Young Sun Shim, Seoul (KR); Jeon Kang, Seoul (KR)

(73) Assignee: LG Electronics, Inc., Seoul (KR)

( * ) Notice: Subject to any disclaimer, the term of this patent is extended or adjusted under 35 U.S.C. 154(b) by 990 days.

(21) Appl. No.: 10/920,173

(22) Filed: Aug. 18, 2004

(65) Prior Publication Data
US 2005/0135787 A1    Jun. 23, 2005

(30) Foreign Application Priority Data
Dec. 23, 2003  (KR) .................... 10-2003-0095448

(51) Int. Cl.
*H04N 7/00*  (2006.01)
*H04N 7/26*  (2006.01)

(52) U.S. Cl. ................... 386/95; 386/124; 725/139

(58) Field of Classification Search ............... 386/46, 386/69, 95–98, 125, 104–106, 111, 126, 386/124; 725/30, 46, 58, 88, 133, 141, 151–153, 725/131, 132, 139–143; 707/9; 369/47, 369/54, 58, 47.1
See application file for complete search history.

(56) References Cited

U.S. PATENT DOCUMENTS

| | | | |
|---|---|---|---|
| 4,439,759 A | | 3/1984 | Fleming et al. |
| 5,539,716 A | | 7/1996 | Furuhashi |
| 5,636,631 A | | 6/1997 | Waitz et al. |
| 5,701,385 A | | 12/1997 | Katsuyama et al. |
| 5,841,447 A | | 11/1998 | Drews |
| 5,912,710 A | | 6/1999 | Fujimoto |
| 5,917,830 A | | 6/1999 | Chen et al. |
| 5,929,857 A | | 7/1999 | Dinallo et al. |
| 5,963,704 A | | 10/1999 | Mimura et al. |
| 5,999,160 A | | 12/1999 | Kitamura et al. |
| 6,009,234 A | * | 12/1999 | Taira et al. .................... 386/95 |
| 6,035,055 A | | 3/2000 | Wang et al. |

(Continued)

FOREIGN PATENT DOCUMENTS

CN    1151586    6/1997

(Continued)

OTHER PUBLICATIONS

International Search Report, dated Apr. 5, 2005 for International Appln. No. PCT/KR 2004/002089.

(Continued)

*Primary Examiner*—Thai Tran
*Assistant Examiner*—Mishawn Dunn
(74) *Attorney, Agent, or Firm*—Harness, Dickey & Pierce, P.L.C.

(57) ABSTRACT

In the data structure for managing reproduction of text subtitle data, a recording area stores graphic control information indicating whether to still a display of main data when a display of graphic information is activated.

33 Claims, 11 Drawing Sheets

| | | | | | |
|---|---|---|---|---|---|
| U.S. PATENT DOCUMENTS | | | 2007/0133948 A1* | 6/2007 | Kikuchi et al. ............... 386/95 |
| 6,046,778 A | 4/2000 | Nonomura et al. | | | |
| 6,072,832 A | 6/2000 | Katto | FOREIGN PATENT DOCUMENTS | | |
| 6,088,507 A * | 7/2000 | Yamauchi et al. ............ 386/95 | CN | 1156377 | 8/1997 |
| 6,112,011 A | 8/2000 | Hisatomi | CN | 1167311 | 12/1997 |
| 6,134,383 A | 10/2000 | Kikuchi et al. | CN | 1103102 | 3/1998 |
| 6,167,189 A | 12/2000 | Taira et al. | CN | 1242575 | 1/2000 |
| 6,167,192 A | 12/2000 | Heo | CN | 1251461 | 4/2000 |
| 6,226,446 B1 | 5/2001 | Murase et al. | CN | 1745579 A | 3/2006 |
| 6,233,393 B1 | 5/2001 | Yanagihara et al. | CN | 101026775 | 8/2007 |
| 6,246,402 B1 | 6/2001 | Setogawa et al. | EP | 0 724 264 B1 | 7/1996 |
| 6,246,790 B1 | 6/2001 | Huang et al. | EP | 0782338 | 7/1997 |
| 6,286,001 B1* | 9/2001 | Walker et al. ................. 707/9 | EP | 0 788 106 | 8/1997 |
| 6,330,210 B1 | 12/2001 | Weirauch et al. | EP | 0831647 | 3/1998 |
| 6,335,742 B1 | 1/2002 | Takemoto | EP | 0 898 279 A2 | 2/1999 |
| 6,366,732 B1 | 4/2002 | Murase et al. | EP | 0 913 822 A2 | 5/1999 |
| 6,392,664 B1* | 5/2002 | White et al. ................. 715/717 | EP | 1 005 043 A1 | 5/2000 |
| 6,393,196 B1 | 5/2002 | Yamane et al. | EP | 1 021 048 | 7/2000 |
| 6,424,793 B1 | 7/2002 | Setogawa et al. | EP | 1 103 974 A2 | 5/2001 |
| 6,433,801 B1 | 8/2002 | Moon et al. | EP | 1 115 119 A2 | 7/2001 |
| 6,445,877 B1 | 9/2002 | Okada et al. | EP | 1 198 133 A1 | 4/2002 |
| 6,470,460 B1 | 10/2002 | Kashiwagi et al. | EP | 1 223 580 A2 | 7/2002 |
| 6,483,983 B1 | 11/2002 | Takahashi et al. | EP | 1 608 165 A1 | 12/2005 |
| 6,504,996 B1 | 1/2003 | Na et al. | EP | 1 868 190 A2 | 12/2007 |
| 6,539,166 B2 | 3/2003 | Kawamura et al. | JP | 6319125 | 11/1994 |
| 6,553,180 B1 | 4/2003 | Kikuchi et al. | JP | 8298554 | 11/1996 |
| 6,574,417 B1 | 6/2003 | Lin et al. | JP | 8329004 | 12/1996 |
| 6,707,459 B1 | 3/2004 | Graves et al. | JP | 8339663 | 12/1996 |
| 6,711,287 B1 | 3/2004 | Iwasaki | JP | 10-215409 | 8/1998 |
| 6,724,981 B1 | 4/2004 | Park et al. | JP | 11018048 | 1/1999 |
| 6,728,477 B1 | 4/2004 | Watkins | JP | 11185463 | 7/1999 |
| 6,757,906 B1 | 6/2004 | Look et al. | JP | 11298860 | 10/1999 |
| 6,766,101 B1 | 7/2004 | Yamada | JP | 2000-083216 | 3/2000 |
| 6,792,154 B1 | 9/2004 | Stewart | JP | 2000-100073 | 4/2000 |
| 6,847,777 B1* | 1/2005 | Nakamura ................... 386/46 | JP | 2000-132953 | 5/2000 |
| 6,850,228 B1 | 2/2005 | Parks et al. | JP | 2000152141 A | 5/2000 |
| 6,871,008 B1 | 3/2005 | Pintz et al. | JP | 2000-222861 | 8/2000 |
| 6,889,001 B1 | 5/2005 | Nikaido et al. | JP | 2000-261802 | 9/2000 |
| 6,999,674 B1 | 2/2006 | Hamada et al. | JP | 2000-333126 | 11/2000 |
| 7,072,401 B2 | 7/2006 | Kim et al. | JP | 2001-184839 | 7/2001 |
| 7,113,694 B2 | 9/2006 | Kim et al. | JP | 2001-251565 | 9/2001 |
| 7,167,637 B2 | 1/2007 | Mori et al. | JP | 2001-312880 | 11/2001 |
| 7,236,687 B2* | 6/2007 | Kato et al. ................... 386/95 | JP | 2002-056651 | 2/2002 |
| 7,237,252 B2 | 6/2007 | Billmaier | JP | 2002-067533 | 3/2002 |
| 7,260,782 B2 | 8/2007 | Wallace et al. | JP | 2002-153684 | 5/2002 |
| 7,454,714 B2 | 11/2008 | Totman et al. | JP | 2002-344805 | 11/2002 |
| 7,509,581 B1 | 3/2009 | Song et al. | JP | 2003-009096 | 1/2003 |
| 2001/0014894 A1 | 8/2001 | Han et al. | JP | 2003249057 A | 9/2003 |
| 2001/0036322 A1 | 11/2001 | Bloomfield et al. | JP | 2006522391 | 9/2006 |
| 2001/0052127 A1 | 12/2001 | Seo et al. | KR | 1994-0016014 | 3/1997 |
| 2002/0006165 A1 | 1/2002 | Kato | KR | 1996-0025645 | 8/1997 |
| 2002/0006273 A1 | 1/2002 | Seo et al. | KR | 2001-0111247 | 12/2001 |
| 2002/0089516 A1 | 7/2002 | Sobol | KR | 2002-0064463 | 8/2002 |
| 2002/0135607 A1 | 9/2002 | Kato et al. | RU | 2180470 | 3/2002 |
| 2002/0174430 A1* | 11/2002 | Ellis et al. ................... 725/46 | RU | 2233011 C2 | 7/2004 |
| 2003/0028892 A1 | 2/2003 | Gewickey et al. | WO | WO 00/30357 | 5/2000 |
| 2003/0147629 A1 | 8/2003 | Kikuchi et al. | WO | WO 00/30358 | 5/2000 |
| 2003/0152365 A1 | 8/2003 | Nagayama | WO | WO 00/31980 | 6/2000 |
| 2003/0161615 A1 | 8/2003 | Tsumagari et al. | WO | WO 00/36600 | 6/2000 |
| 2003/0179900 A1 | 9/2003 | Tian et al. | WO | WO 00/60598 | 10/2000 |
| 2004/0047591 A1* | 3/2004 | Seo et al. .................... 386/46 | WO | WO 01/35409 | 5/2001 |
| 2004/0070628 A1 | 4/2004 | Iten et al. | WO | WO 01/45102 | 6/2001 |
| 2005/0004581 A1 | 1/2005 | Astrom | WO | 02004/028157 A1 | 4/2004 |
| 2006/0045481 A1 | 3/2006 | Yahata et al. | WO | WO 2004/098193 | 11/2004 |
| 2006/0064716 A1 | 3/2006 | Sull et al. | WO | WO 2004/114658 | 12/2004 |
| 2006/0143666 A1 | 6/2006 | Okada et al. | WO | WO 2005/002220 | 1/2005 |
| 2006/0153535 A1 | 7/2006 | Chun et al. | WO | WO 2005/048261 | 5/2005 |
| 2006/0165388 A1 | 7/2006 | Uesaka et al. | WO | WO 2005/048592 | 5/2005 |
| 2006/0188223 A1 | 8/2006 | Ikeda et al. | WO | WO 2005/052941 | 6/2005 |
| 2006/0282775 A1 | 12/2006 | Yahata et al. | | | |
| 2007/0057969 A1 | 3/2007 | McCrossan et al. | | | |

| | | |
|---|---|---|
| WO | WO 2005/078727 | 8/2005 |

OTHER PUBLICATIONS

"Digital Video Broadcasting (DVB); Subtitling systems", Final Draft ETSI EN 300 743 V1.2.1, ETSI, Jun. 2002.

Office Action for corresponding Russian application dated May 5, 2008.

Chinese Office Action corresponding to Chinese Application No. 200480018833.5 dated Aug. 1, 2008.

Chinese Office Action corresponding to Chinese Application No. 200480018832.0 dated Aug. 1, 2008.

Indian Office Action corresponding to Indian Application No. 834/KOLNP/2006 dated Oct. 31, 2008.

European Search Report corresponding to European Application No. 04737126.5 dated Sep. 1, 2008.

European Search Report corresponding to European Application No. 04748368.0 dated Sep. 1, 2008.

"Digital Video Broadcasting (DVB); Subtitling systems", Jun. 1, 2002.

"MPEG-2: A Tutorial Introduction to the Systems Layer", P.A. Sarginson, Jan. 1, 1995.

Office Action for European patent application No. 04774353 dated May 15, 2009.

Office Action for Japanese patent application No. 2006-546802 dated May 22, 2009 (with English translation).

Office Action for Russian patent application No. 2006116879/28 dated Jun. 22, 2009 (with English translation).

European Search Report dated Dec. 16, 2009 for related application No. 04774353.9.

Russian Notice of Allowance dated Sep. 17, 2009 issued in corresponding Russian Application No. 2006110935/28.

Russian Notice of Allowance dated Oct. 29, 2009 issued in corresponding Russian Application No. 2006116879/28.

Japanese Notice of Allowance dated Mar. 16, 2010 (English translation).

* cited by examiner

RECORDING MEDIUM HAVING A DATA STRUCTURE FOR MANAGING GRAPHIC INFORMATION AND RECORDING AND REPRODUCING METHODS AND APPARATUSES

CROSS-REFERENCE TO RELATED APPLICATIONS

This application claims the benefit of priority under 35 U.S.C. 119 on Korean Application No. 10-2003-0095448, filed on Dec. 23, 2003, which is hereby incorporated by reference in its entirety.

BACKGROUND OF THE INVENTION

1. Field of the Invention

The present invention relates to high density recording media such as read-only blu-ray discs (BD-ROM).

2. Discussion of Related Art

Optical discs are widely used as an optical recording medium. Presently, of the optical discs, a new high density optical recording medium (HD-DVD), such as the Blu-ray Disc (hereafter called as "BD"), for recording and storing a large amount of high definition video and audio data is under development.

Currently, global standard technical specifications of the Blu-ray Disc (BD), a next generation HD-DVD technology, are being established as a next generation optical recording solution that can store amounts of data significantly surpassing present DVDs.

In relation to this, development of optical reproducing apparatuses for the Blu-ray Disc (BD) standards has also started. However, the Blu-ray Disc (BD) standards are not complete yet, and there has been difficulty in developing a completed optical reproducing apparatus.

Particularly, for effective reproduction of data from the Blu-ray Disc (BD), menu information must be organized and provided so that through interaction with the user, selective data reproduction may take place. However, in the present Blu-ray Disc (BD) standards, because consolidated standards of the supplementary data, particularly the menu information are not complete yet, there are many restrictions on the development of a Blu-ray Disc (BD) optical reproducing apparatus, which causes problems with reproducing the menu information and providing it to the user according to a request of the user.

SUMMARY OF THE INVENTION

A recording medium according to the present invention includes a data structure for managing reproduction of graphic information.

In one embodiment, the recording medium stores graphic control information indicating whether to still a display of main data when a display of graphic information is activated. For example, the graphic information may be a menu.

In one embodiment, the activation of the display of graphic information is based on user input.

In a further embodiment, the graphic control information also indicates whether display of the graphic information is forbidden.

As will be described with respect to other embodiments, either a playitem or a subplayitem of a playlist may include navigation information for reproducing the graphic information.

In a further embodiment, the recording medium stores graphic information for display and stores mask information indicating whether display of the graphic information is forbidden. For example, the graphic information may be a menu.

In one embodiment, the mask information is stored in a playlist file on the recording medium. For example, the mask information is stored in an application information playlist field of the playlist file.

The present invention further provides apparatuses and methods for recording and reproducing the data structure according to the present invention.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention. In the drawings.

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

Figure 1:
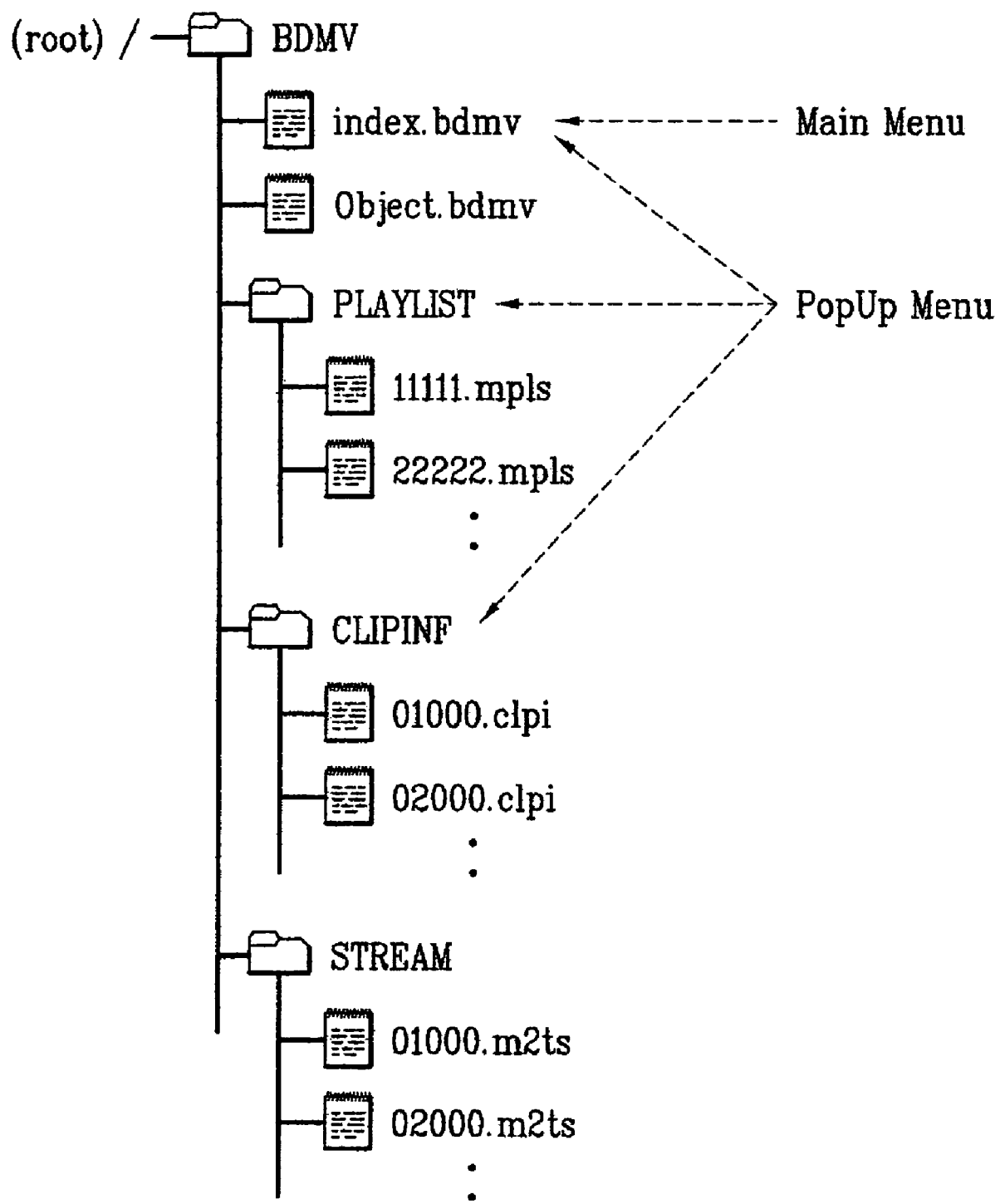
FIG. 1 illustrates a file structure of a high density optical disc in accordance with one embodiment of the present invention.

FIG. 1 illustrates a file structure of a high density optical disc in accordance with one embodiment of the present invention. As shown, the file structure includes at least one BD directory BDMV under a root directory. The BDMV directory has an index file index. bdmv, an Object file object. Bdmv, a play list directory PLAYLIST, a clipinfo directory CLIPINF, and a stream directory STREAM. These directories and files will be discussed in reverse order below.

The stream directory STREAM has files of at least one main video and audio stream (called as "main AV stream"). Since the "main AV stream" is recorded as widely known MPEG 2 transport packets, an expansion name of a main AV stream file (e.g., 01000.m2ts and 02000.m2ts) will be "*.m2ts".

A stream file is sometimes referred to as a clip stream file in the BD standards, and in the present invention, subtitle data and/or an interactive graphic stream data may be multiplexed with the main AV stream, or may exist as a separate file, separate from the AV stream.

The clipinfo directory CLIPINF has clipinfo files (e.g., 01000.clpi, and 02000.clpi) that correspond one-to-one with the AV stream files (e.g., *.m2ts, and *.txt—if a text subtitle exists in a separate file form, the extension name of the AV stream will be "*.txt"). Particularly, the clipinfo file *.clpi has attribute information and timing information for the corresponding stream file. The timing information includes information on mapping a Presentation Time Stamp (PTS) of data in the AV stream file to a source packet number of a source packet in the AV stream file typically this map is referred to as an entry point map. In the BD standard, the AV stream file *.m2ts, and *.txt files and the corresponding clipinfo file *.clpi are collectively called a "clip". Accordingly, the file "01000.clpi" in the clipinfo directory CLIPINF has attribute information and timing information on the file "01000.m2ts" in the stream directory, and the files "01000.clpi" and "01000.m2ts" form a clip.

The playlist directory PLAYLIST has playlist files *.mpls, each having at least one playitem PlayItem designating a playing interval of a particular clip. The playitem PlayItem has information on a play starting time (In-Time) and play end time (Out-Time) of a particular clip desired to play, i.e., designated by the clip name given in a Clip_Information_File field in the playitem PLAYITEM. Moreover, the playlist file *.mpls may be provided with a sub-playitem SubPlayItem as necessary, such as when data is to be played non-synchronized with the playitem PlayItem.

In the BD directory BDMV, there are an index file index.bdmv and an object file Object.bdmv as general files for securing user interactivity. The index file index.bdmv includes an index table index Table having main menu Menu information and title information Title the user can select.

Particularly, the main menu information recorded in the index Table is called as a main menu or a top menu. In relation to this, the subject disclosure introduces a popup menu, which is newly defined as new menu information separate from the main menu. A popup menu may provide detailed menu information according to the data attributes of a specific reproducing unit, and may be provided through a small window in the display that may overlap a currently reproduced picture in some cases.

Accordingly, the popup menu managing information is provided in each title. For example, a title may be divided into chapters each represented by one of a plurality of reproduction units, and popup menu information may be associated with each reproduction unit. Also, popup menu information may be provided as part of a playlist file (*.mpls), a clipinfo file (*.clpi), etc. Below, the main menu and the popup menu will be described in more detail referring to FIGS. 3A and 3B.

Figure 2:
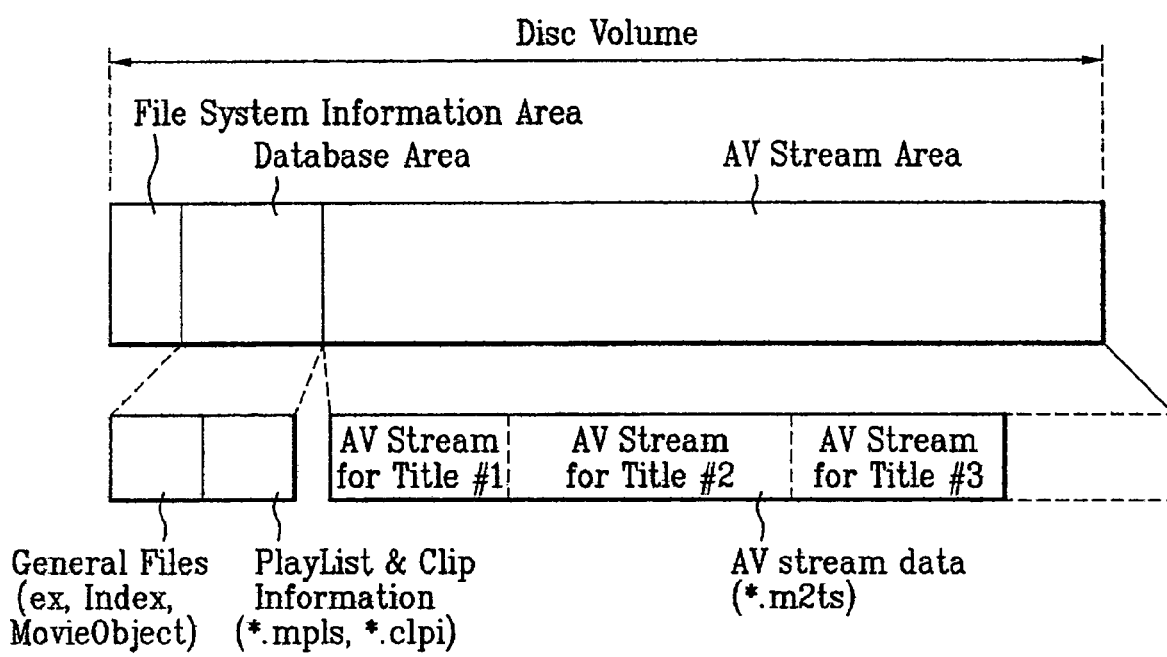
FIG. 2 schematically illustrates a disc volume for storing the file structure of FIG. 1 in accordance with an embodiment of the present invention.

As shown in FIG. 2, the disc volume of a BD-ROM is organized into a file system information area, a database area, and an A/V stream area. The file system information area stores system information for managing the disc. The database area includes a general files area and a playlist and clip information area. The general files area stores general files such as the index.bdmv file and the Object.bdmv file. The playlist and clip information area stores the PLAYLIST directory and the CLIPINF directory. The main data and the supplementary data, such as audio/video/graphic, recorded thereon are stored as the MPEG2 transport stream formatted clip files (*.m2ts) in the A/V stream area.

Figure 3A:
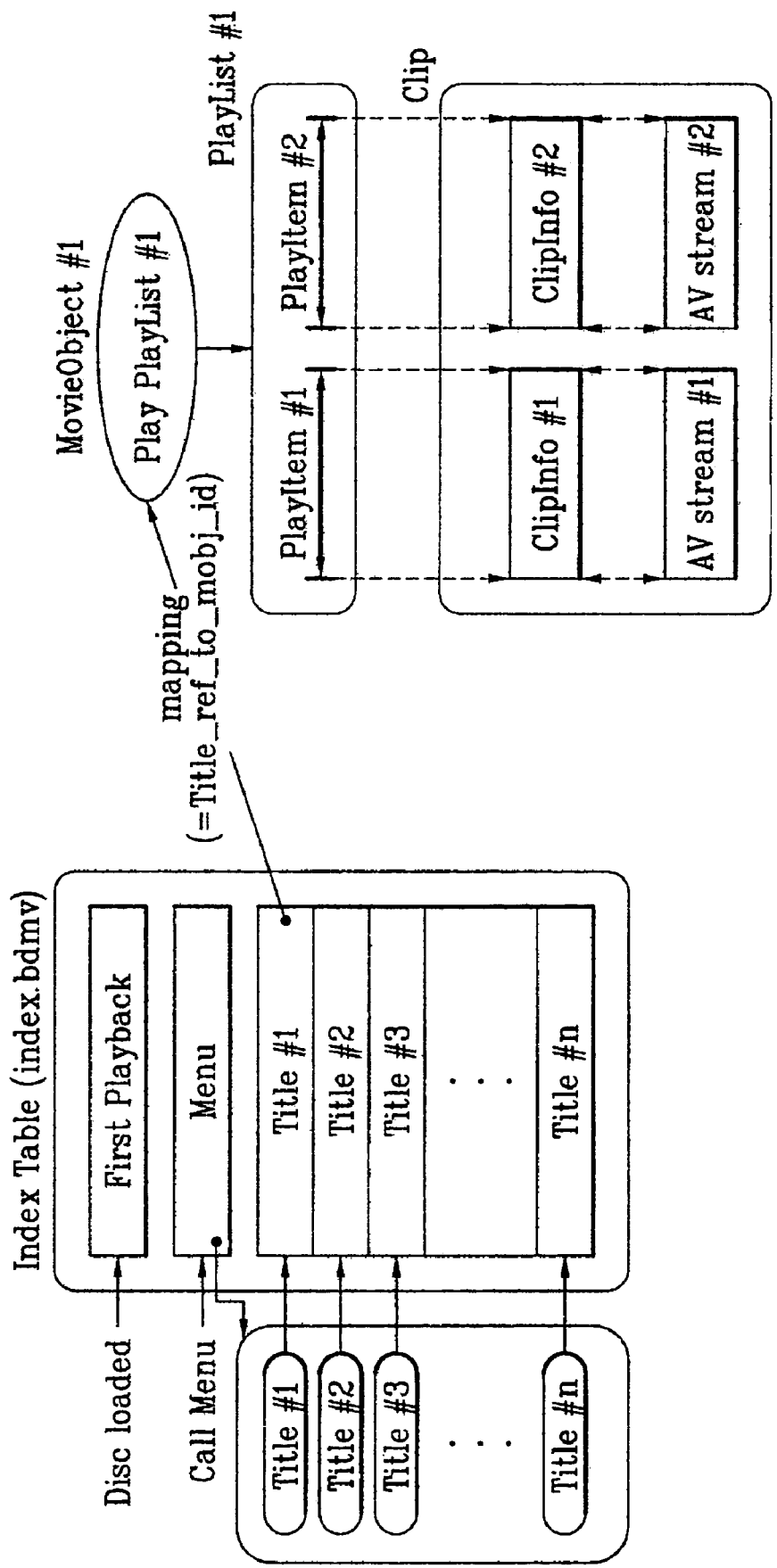
FIGS. 3A to 3B illustrate a data structure of the recording medium (e.g., BD-ROM) for managing graphic information such as a popup menu and a method for managing the menu information in accordance with an embodiment of the present invention.
Figure 3B:
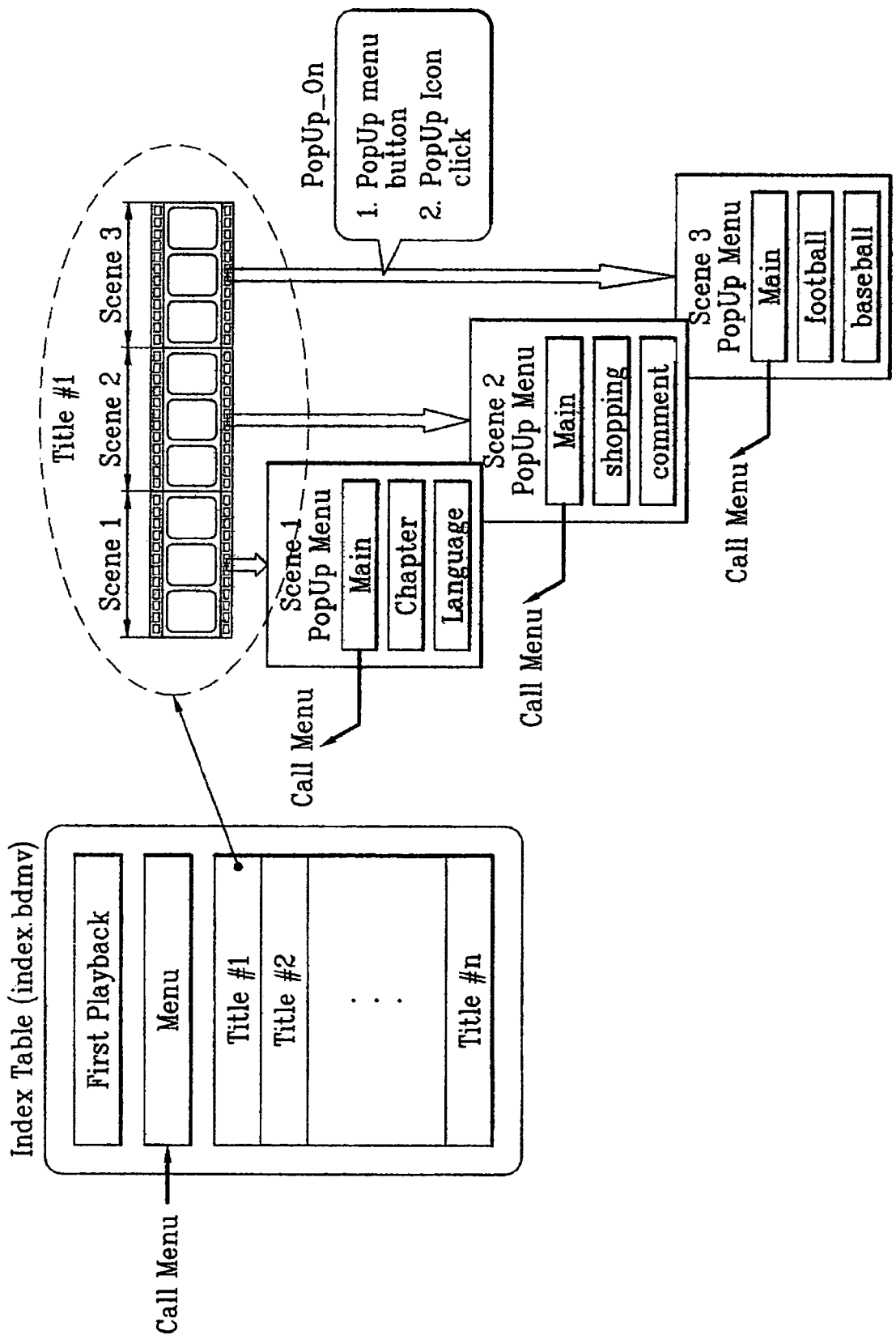

FIGS. 3A to 3B illustrate a data structure of the recording medium (e.g., BD-ROM) for managing graphic information such as a popup menu and a method for managing the menu information in accordance with an embodiment of the present invention. Specifically, FIG. 3A schematically illustrates the file structure provided by the main menu information in the index table, and FIG. 3B illustrates the data structure for managing popup menu information according to an embodiment of the present invention.

As shown in FIG. 3A, the file structure for managing the main menu includes the index file index.bdmv having main menu information. Specifically, the index file index.bdmv includes an Index Table having the main menu information Menu, title information Title #1, . . . , Title #n, and first playback information First Playback. The information in the index table is linked one-to-one with information in the corresponding object file Object.bdmv, which controls reproduction.

Accordingly, the main menu information in the Index Table is performed by a user request "Call Menu", and in the main menu, a basic title menu Title is included. Thus, the user can select from the main menu, one of the titles the user wants to reproduce.

If the user selected the title #1, the title #1 selection is mapped to an object (e.g., MovieObject #1) in the Object.bdmv file determined by link information in the title #1 information of the index table. The MovieObject #1 includes navigation commands that instruct playback of a playlist, for example PlayList #1.

In the example of FIG. 3A, the playlist PlayList #1 includes playitems PlayItem #1 and #2 that each identify the clip (clip information file and A/V stream clip file) to reproduce as the title #1.

The first playback information First Playback in the index table Index Table includes link information that is automatically loaded when the disc is loaded. As such, the playlist file and clip file linked to the first playback information by an object in the object.bdmv file are reproduced, automatically, in the same manner as discussed above with respect to the title #1.

In the process for reproducing a corresponding title, reproduction starts from the main menu. The main menu is limited to providing general, title based main menu information for the total disc, and there is a limitation in properly providing the main menu according to the attributes of the recorded data.

Owing in part to the above, when the data attributes of the recorded data are different and/or more detailed, separate additional menu information may be provided to the user so as to provide convenience and an environment different from the convention optical disc.

The additional menu information is graphic information called a popup menu as described earlier. FIG. 3B illustrates the data structure for managing the graphic information forming popup menu information according to an embodiment of the present invention.

First, contrary to the main menu which provides general menu information for the total disc, the popup menu information is menu information associated with a reproduction unit (e.g., a scene or chapter of a title) according to the data attributes of the data recorded in the reproduction unit. In FIG. 3B, the specific reproduction unit is called scene.

A scene is a specific reproduction section having the same popup menu as established by the disk author. For example, a title or chapter can be the scene, and only some scenes can be set with a popup menu.

Accordingly, the method for dividing a main AV stream into scenes in the file structure may vary, for example, by using the title information in the index file, a playitem in the playlist, a subplayitem, playlist mark information, or clip information in the clip file. These methods will be described in more detail below.

In relation to above, FIG. 3B illustrates a case wherein a plurality of scenes are provided in the specific title, for example, Title #1, and a specific popup menu is provided in each scene. As shown, scene #1 includes a popup menu enabling chapter change and language change, scene #2 includes a popup menu having a menu enabling shopping and a comment menu having enhanced data, scene #3 includes a popup menu having a football menu and baseball menu. In other words, one reason why the popup menu is constructed is for increasing flexibility of use based on the data attributes of a corresponding scene. It will be appreciated that a popup menu may be constructed in various ways, and is not limited to the examples given in FIG. 3B.

Each popup menu includes a menu for providing the main menu in the index table, therefore, when the corresponding "main menu" in the popup menu is selected, a "Call Menu" to the main menu in the index file is carried out so as reproduce the main menu from the index file.

Second, contrary to how the main menu is displayed, the popup menu is displayed overlapping, using a small window, a presently reproduced picture without changing the presently reproduced picture. As such, the presently reproduced picture becomes the background picture. The background picture may be a stilled or paused picture, or may be continuously reproduced without being paused. These features will be described in greater detail below.

Although the main menu and popup menu are activated by the execution command of the user, in general, by an input of the menu execution button, the popup menu may be activated in many different ways. For example, an icon may displayed to indicated that a popup menu is available with respect to presently reproduced data. A user may then click on the corresponding icon using control buttons on a remote, for example, to activate the popup menu.

As an example, in FIG. 3B, the command for activating a popup menu will be called "PopUp_on", and this command may be provide by at least one of following methods: (1) from a menu button of the remote control the user has, or (2) by clicking the popup menu icon in the displayed picture. In other words, applying both of the two methods is possible.

The popup menu provides specific menu information in an area of a display based on the data attributes in a specific reproduction unit. However, the execution of a popup menu may be performed in various ways. For example, the popup menu may be activated while pausing or stilling the background picture (e.g., main AV data) without a conversion of the background picture when the execution command is received, or the main AV data may be continuously reproduced while the popup menu is displayed. When the display of the popup menu ends, the stilled background picture may then un-still or un-pause.

Hereinafter, various embodiments of the popup menu and the data structure and method for managing the popup menu will be described.

Figure 4:
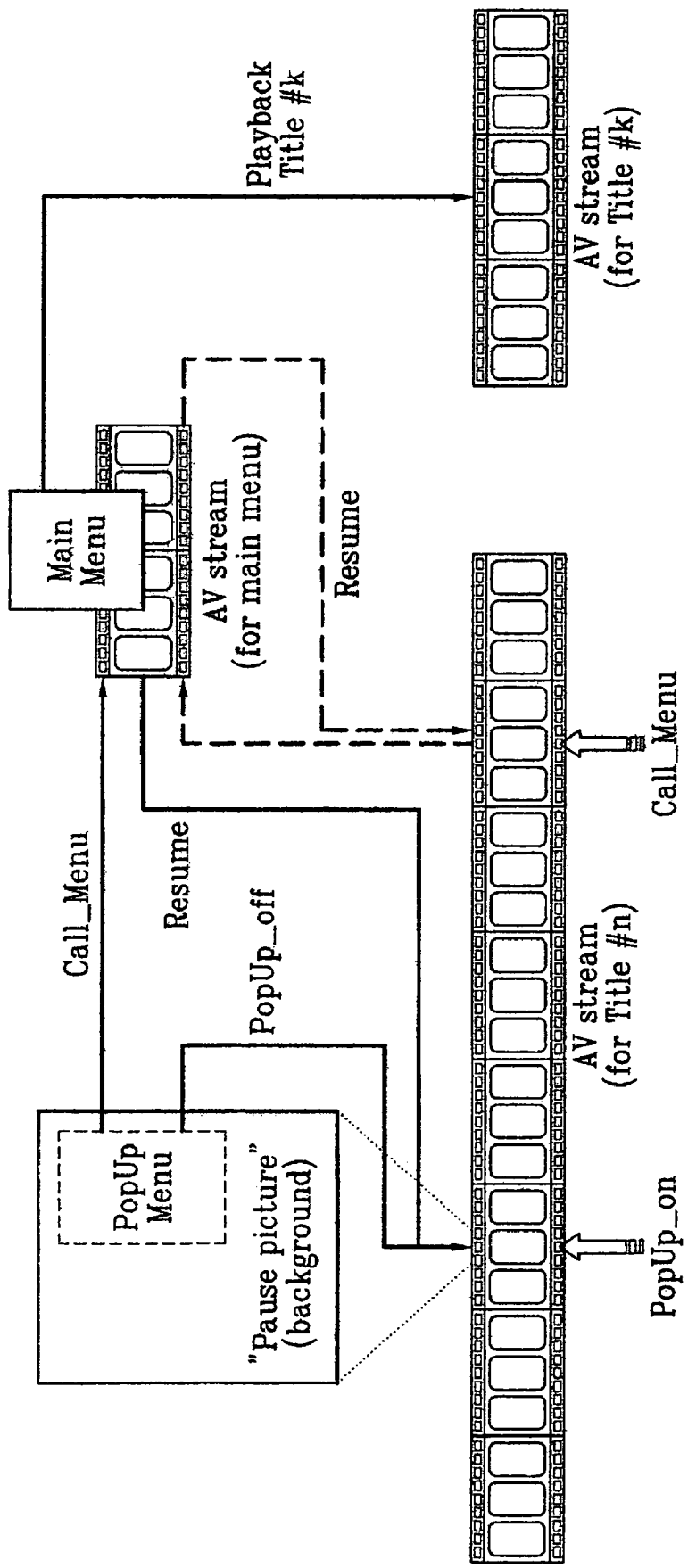
FIG. 4 illustrates a first embodiment for managing a popup menu according to the present invention.

FIG. 4 illustrates a first embodiment for managing a popup menu according to the present invention. In this embodiment, a background picture such as the main AV data being reproduced is paused or stilled during the time that the popup menu is displayed.

When the command for executing or activating the popup menu PopUp_on is received in the middle of reproducing a predetermined title Title #n, the controller (see FIG. 9 discussed below) in an optical record reproducing apparatus pauses or stills the data presently being reproduced, and with the picture represented by the reproduced data being stilled, the popup menu is generated in a window overlapping the picture such that the picture becomes a background picture. Thereafter, if the user selects a specific menu from the popup menu (e.g., if a language menu from the popup menu is selected and English from the corresponding language menu is selected), the controller of the optical record reproducing apparatus uses the selection as disc reproducing information. Then, in accordance with a command for ending the popup menu (e.g., a PopUp_off command received from the user or automatically generated by a specific menu selection), the controller deactivates the popup menu (e.g., removes the display of the popup menu) and automatically continues reproducing the main AV data, which formed the background picture, from the point when the execution command for the popup menu was received.

Meanwhile, when the main menu Call_Menu is selected on the popup menu or during the reproduction of general data, the background picture is converted into a main picture used with the main menu, and based on the main menu selections, the command of a user is performed. For example, when the user wants to change to another title, title #k and reproduce title #k, the corresponding title #k is reproduced.

However, if the user wants to return to the original background picture (Resume command), the picture is returned to the background picture at a time when the popup menu execution command PopUp_on or "Call_Menu" command was received.

As aforementioned, the reason why the presently reproduced picture is paused or stilled as the background picture by the execution command of the popup menu is because in general the user wants to change the background picture through the popup menu while watching the presently reproduced picture. For example, as aforementioned, when changing the language, it is natural that the intension of the user is to change the language from the present time. And, also in a case of enabling a shopping menu, it is natural that the user wants to shop a specific item of the presently reproduced picture. Therefore, if the background picture is continuously reproduced without stilling or pausing, in spite of the execution command of the popup menu (PopUp_on), an error with a selection using the menu may occur.

Figure 5:
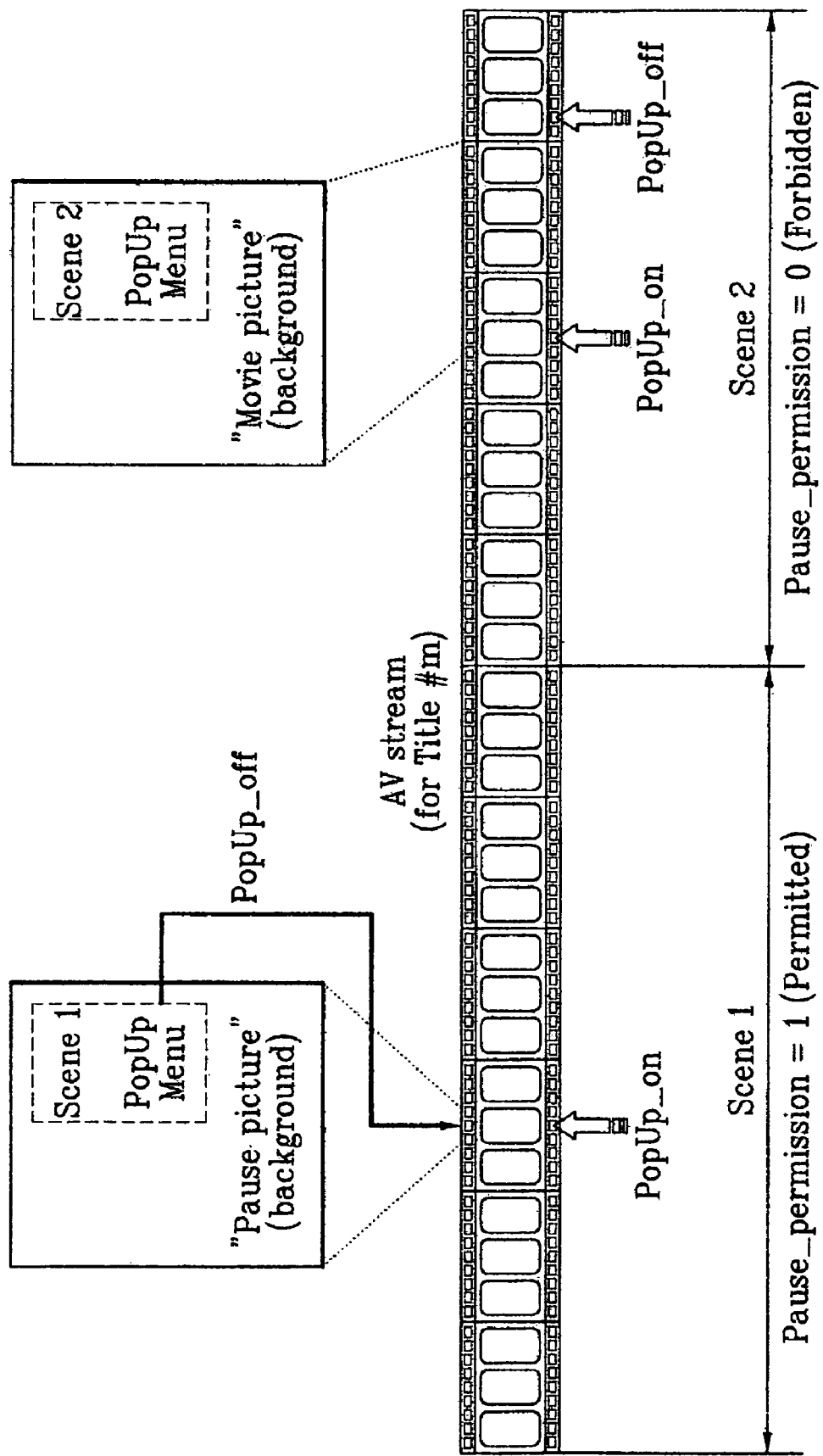
FIG. 5 illustrates a second embodiment for managing a popup menu according to the present invention.

FIG. 5 illustrates another embodiment for managing a popup menu according to the present invention. The popup menu action is performed based on identification being provided by the reproduction unit for distinguishing whether to pause or continuously reproduce the background picture, particularly, during the performance of the popup menu.

In this second embodiment, the author of the optical disc includes an indicator associated with a reproduction unit (e.g., a scene) that indicates whether stilling or pausing the reproduced AV stream (also referred to as the background or background picture in this disclosure) is permitted when a popup menu is activated. In other words, the author determines and records data on the optical disc, and may determine that it is desirable that the presently reproduced picture be continuously reproduced without pause even when the execution command of the popup menu is received for data corresponding to specific scene. Therefore, the indicator for permitting still or pause in association with activating a popup menu is recorded as managing information in the disc in each scene where a popup menu exists. Based on reproduction of this indicator, the controller of the reproducing apparatus determines whether or not to pause or still the AV data when a popup menu is enabled.

As shown in FIG. 5, the indicator may be called "Pause_permission". Pause is disabled when "Pause_permission=0" (called "Movie"), and the presently reproduced picture is paused as the background picture if "Pause_permission=1" during the performance of the popup menu. In FIG. 5, for example, the scene #1 in the specific title (Title #m) has "Pause_permission=1"—permitting the pause. As such the operation of a popup menu and stilling of the background picture is the same as described above with respect the first embodiment in FIG. 4. The scene #2, however, has "Pause_permission=0", and the reproduction apparatus is forbidden from pausing the main AV data. Accordingly, the background picture is continuously reproduced ("Movie") even when the popup menu is enabled, and when a command for terminating the popup menu execution is received, the corresponding popup menu is removed and the background picture is continuously reproduced without being influenced.

Figure 6:
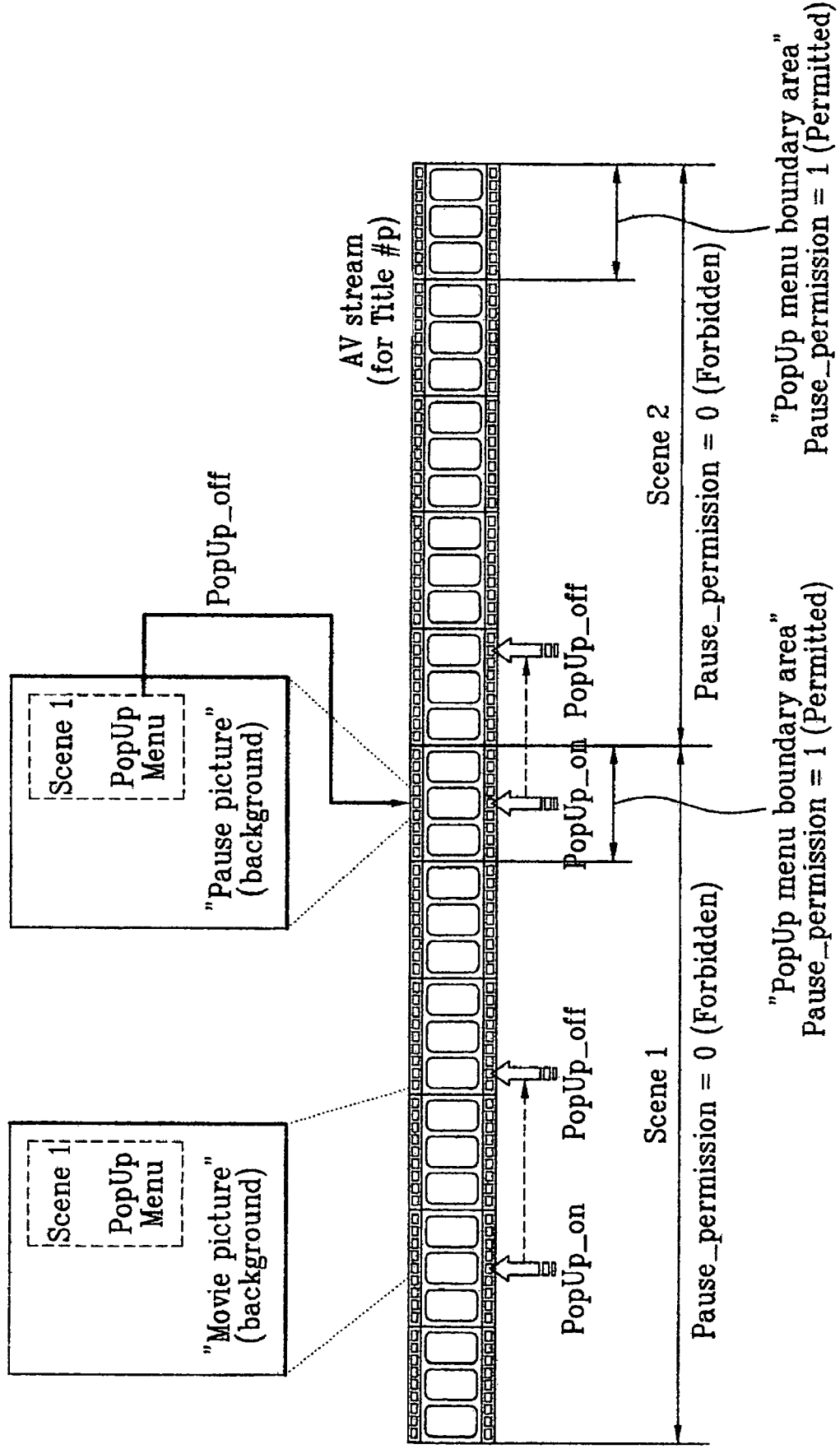
FIG. 6 illustrates a third embodiment for managing a popup menu according to the present invention.

FIG. 6 illustrates a further embodiment for managing a popup menu according to the present invention. In this embodiment, when the popup menu is activated and even if Pause_permission=0 (i.e., stilling the main AV data is prohibited), if the enablement of the popup menu takes place at a particular point within the specific reproduction unit (e.g., a specific point in a scene), then the background picture is paused.

For example, for the majority of the scenes in the specific title, title #p which have "Pause_permission=0" in FIG. 6, the optical reproducing apparatus (see FIG. 9) maintains the background picture in the "Movie" state during those scenes (e.g., scene #1 and scene #2), when the popup menu execution command (PopUp_on) is received. However, there exists a section to pause the background picture when the popup menu execution command (PopUp_on) is received. In the example of FIG. 6, this section is the portion of the main AV data near the boundary between scenes.

In other words, when the execution command (PopUp_on) is received at the point where scene #1 will soon change to scene #2, it is assumed that the user intended to display the popup menu during the corresponding reproduction unit (scene #1). However, if the corresponding scene #1 has "Pause_permission=0, the "Movie" state would be maintained and a menu selection may occur during the next scene, scene #2. This unintended selection during scene #2 may cause problems.

Therefore, in this embodiment, although the scene #1 has "Pause_permission=0", this specific section (e.g., end of the scene) is treated as if the "Pause_permission=1". Particularly, in this section called a "PopUp menu boundary area", the background picture may be paused when the popup menu execution command (PopUp_on) is received. For this embodiment, additional information such as "boundary_start/end_time" or "boundary_duration" is provided as part of the data structure associated with managing the popup menu and the main AV data to define the PopUp menu boundary area.

Besides the specific example given above with respect to this third embodiment, it will be appreciated that other methods exist for dealing with the problem of menu selections during an unintended reproduction unit. For example, an alternative solution includes forbidding enablement of the popup menu (PopUp_on) within the "Popup menu boundary area" of the specific reproduction unit when the specific reproduction unit is set "Pause_permission=0". Another solution is to terminate the popup menu when the corresponding scene #1 terminates. A still further solution is to provide the user with the popup menu related to the next scene, scene #2, when the popup menu enabling command is received within the "Popup menu boundary area" of scene #1.

Figure 7:
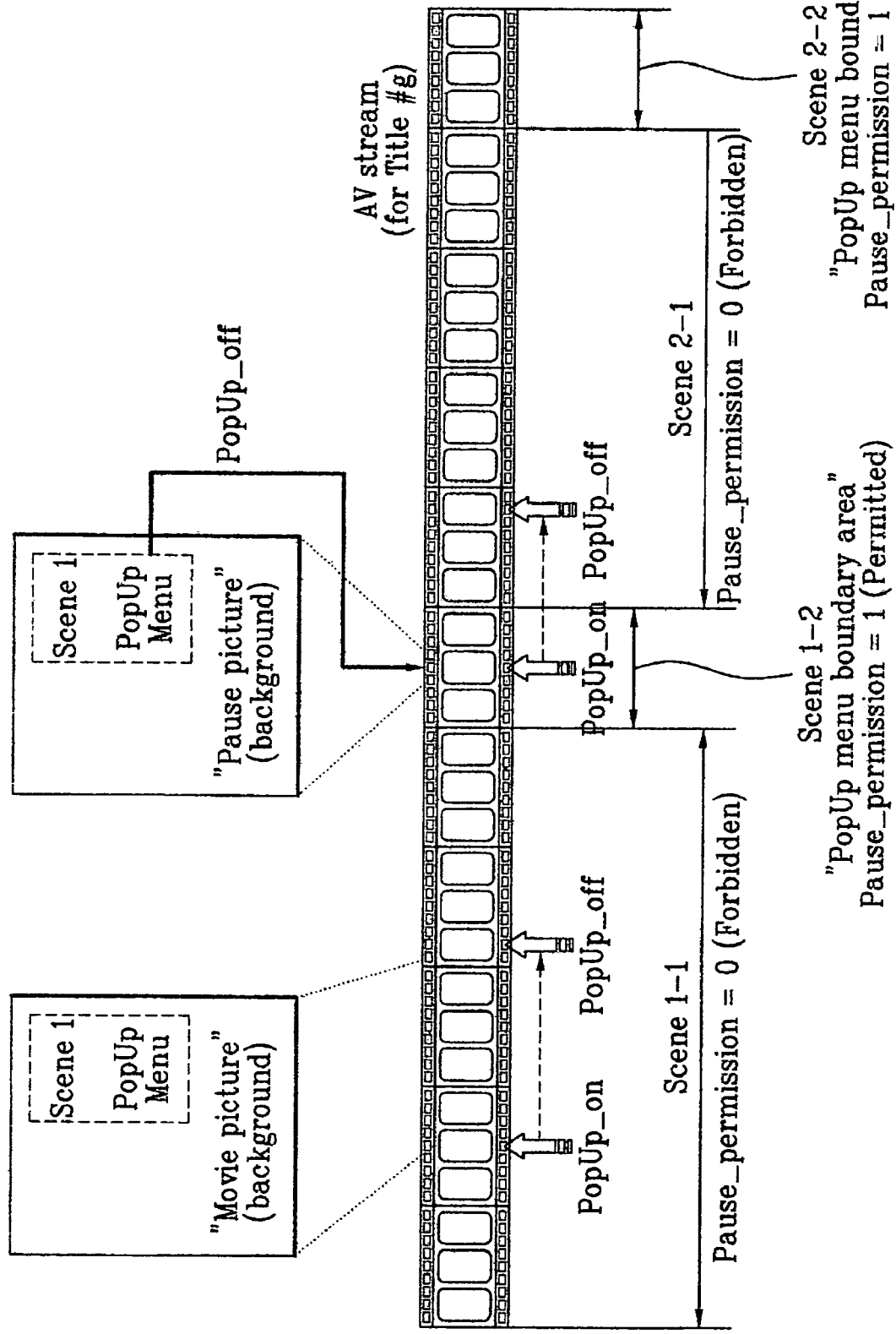
FIG. 7 illustrates a fourth embodiment for managing a popup menu according to the present invention.

FIG. 7 illustrates a fourth embodiment for managing a popup menu according to the present invention. In this embodiment, a last specific section of the scene #1 is defined as a new scene #1-2 where the scene #1 converts into the scene #2. In this new scene, which is basically the "Popup menu boundary area" discussed above with respect to the embodiment of FIG. 6, the Pause_permission is set to "1" to permit stilling of the main AV data when the popup menu is activated by the user.

Ultimately, the fourth embodiment of the present invention is a method of managing the "PopUp menu boundary area" as a separate scene. In other words, the scene is divided into a scene #1-1 wherein "Pause_permission=0", and a scene #1-2 wherein "Pause_permission=1", and all contents of the popup menu are for the scene #1.

For example, in the specific title #g shown in FIG. 7, there are two popup menus for the scenes #1 and #2. However, each scene is divided into scenes #1-1, #2-1 wherein "Pause_permission=0", and scenes #1-2, #2-2 wherein "Pause_permission=1".

Figure 8A:
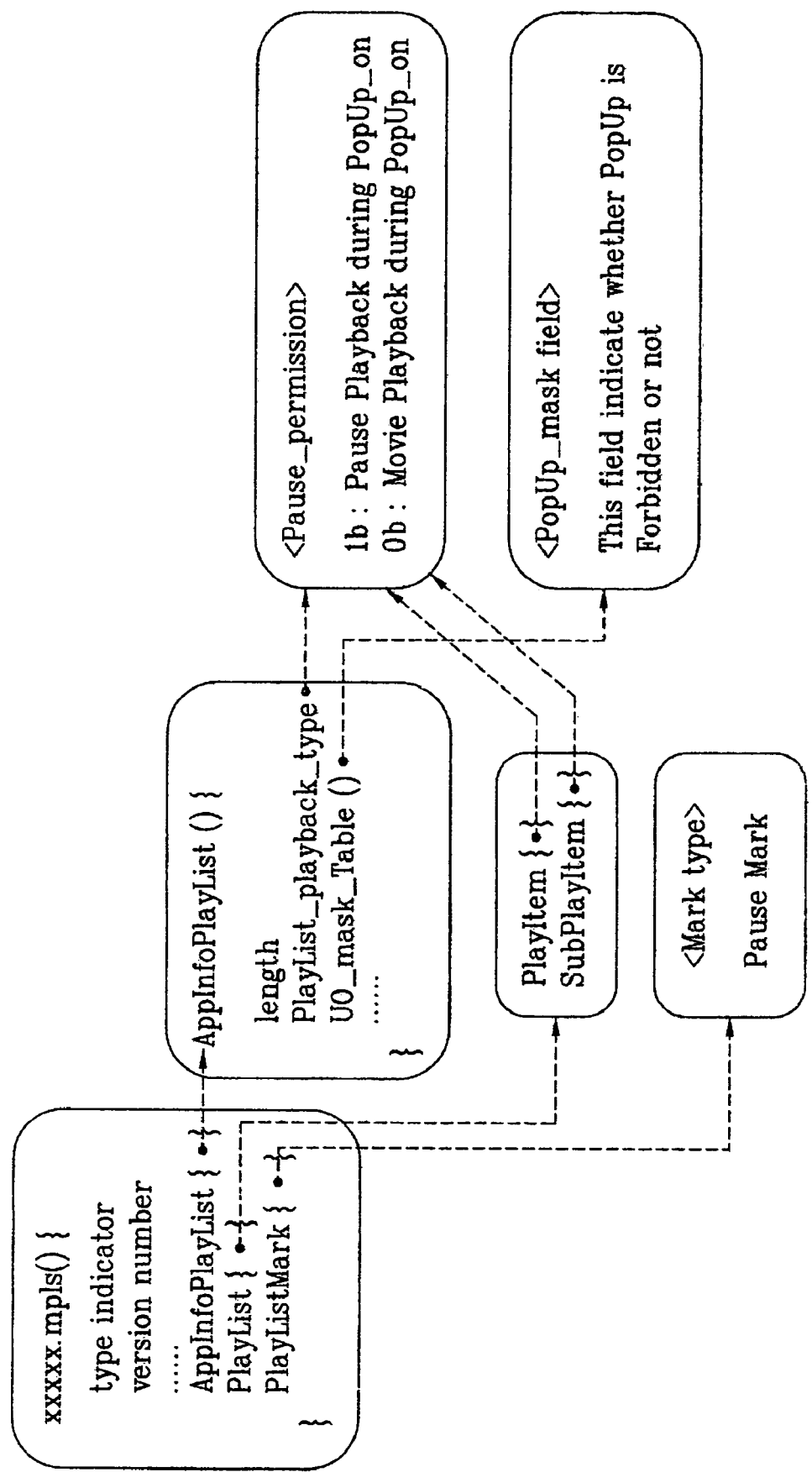
FIG. 8A to FIG. 8C illustrate embodiments of the data structure for managing the popup menu according to the present invention.
Figure 8B:
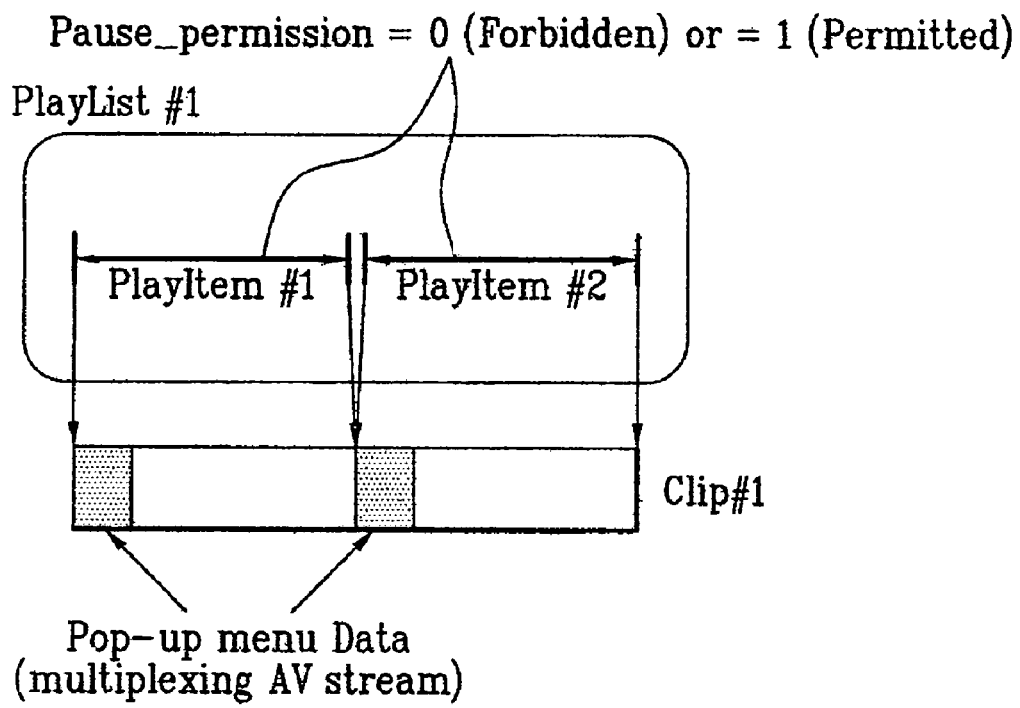
Figure 8C:
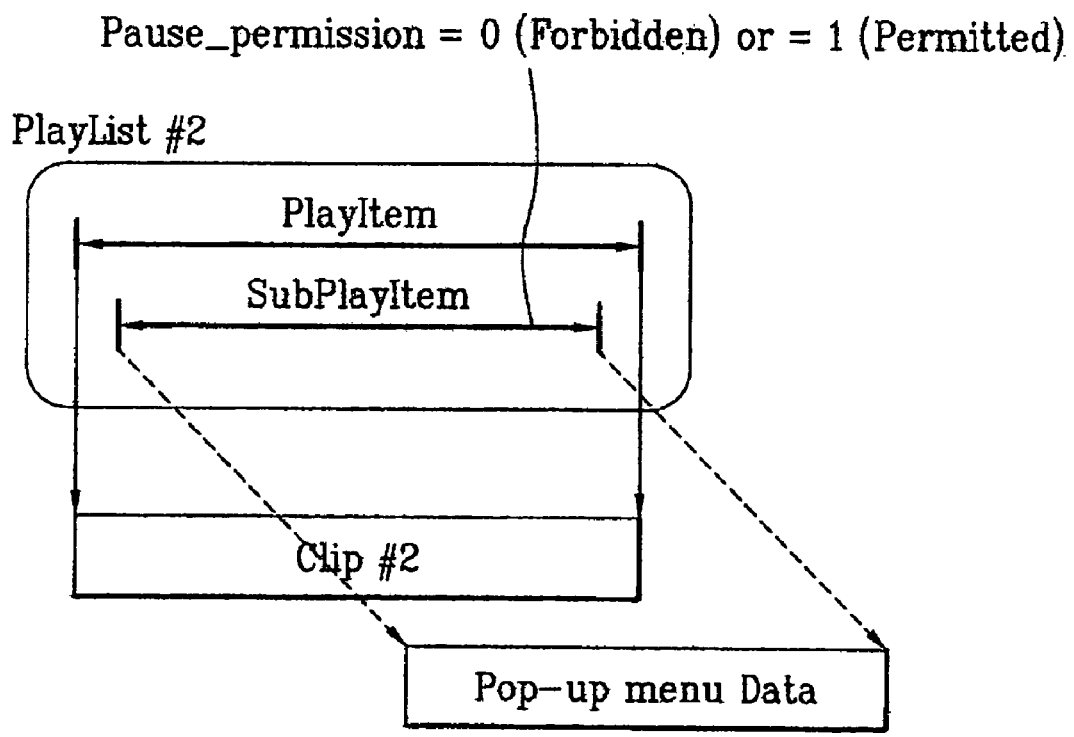

FIG. 8A to FIG. 8C illustrate embodiments of the data structure for managing the popup menu according to the present invention. FIG. 8A illustrates an example of the popup menu related information recorded in the playlist file (*.mpls). As shown, the playlist file includes "AppInfoPlayList { }" for recording application information, "PlayList { }" for recording playitem and sub-playitem information, and "PlayListMark { }" for recording mark information.

For distinguishing whether the disc supports the popup menu of the present invention, a <PopUp_mask> field is provided in the "UO_mask_Table ( )" of "AppInfoPlayList { }". The reproduction unit (or disc) does not support the popup menu when the corresponding field is "0", and the disc (or the reproduction unit) does support a popup menu when the corresponding field is "1".

"Pause_permission" needed for applying the second to fourth embodiments is set in a scene unit as in the second embodiment, or in the specific section as in the third embodiment. Therefore, a "Pause_permission" field is defined in the "PlayList_playback_type" in "AppInfoPlayList { }", or in the "Playitem ( )" or the "SubPlayItem 0" in the "PlayList { }".

Furthermore, this embodiment introduces a "Pause_Mark" as a <Mark_type> in "PlayListMark { }". In this embodiment, the pause mark identifies the picture data to still as the background picture when "Pause_permission=1" and a popup menu is activated. By setting "Pause_Mark" at a location of a specific I-picture on the MPEG2 stream, a stable reproduction of the pause picture is enabled during activation of the popup menu.

FIG. 8B and FIG. 8C illustrate an example of the "Pause_permission" identification recorded in the playitem and the sub-playitem, respectively. First, FIG. 8B illustrates the case of recording the "Pause_permission" identification in the playitem. In this case, the graphic information representing the popup menu is synchronized with the main stream and multiplexed. In other words, in the clip #1, the popup menu data and general data are multiplexed and reproduced with the playitems #1 and #2. As illustrated in FIG. 8A, "Pause_permission" identification is recorded in the syntax describing the playitem.

FIG. 8C illustrates the case of recording the "Pause_permission" identification in the sub-playitem. In this case, the graphic information representing the popup menu exists as a separate file unsynchronized with the main stream. In other words, apart from the clip #2 of main AV data, a file exists only for the popup menu data. The clip #2 for general data is reproduced by the playitem, and the popup menu data is reproduced with the sub-playitem. As illustrated in FIG. 8A, in the syntax describing the sub-playitem, the "Pause_permission" identification is recorded.

Figure 9:
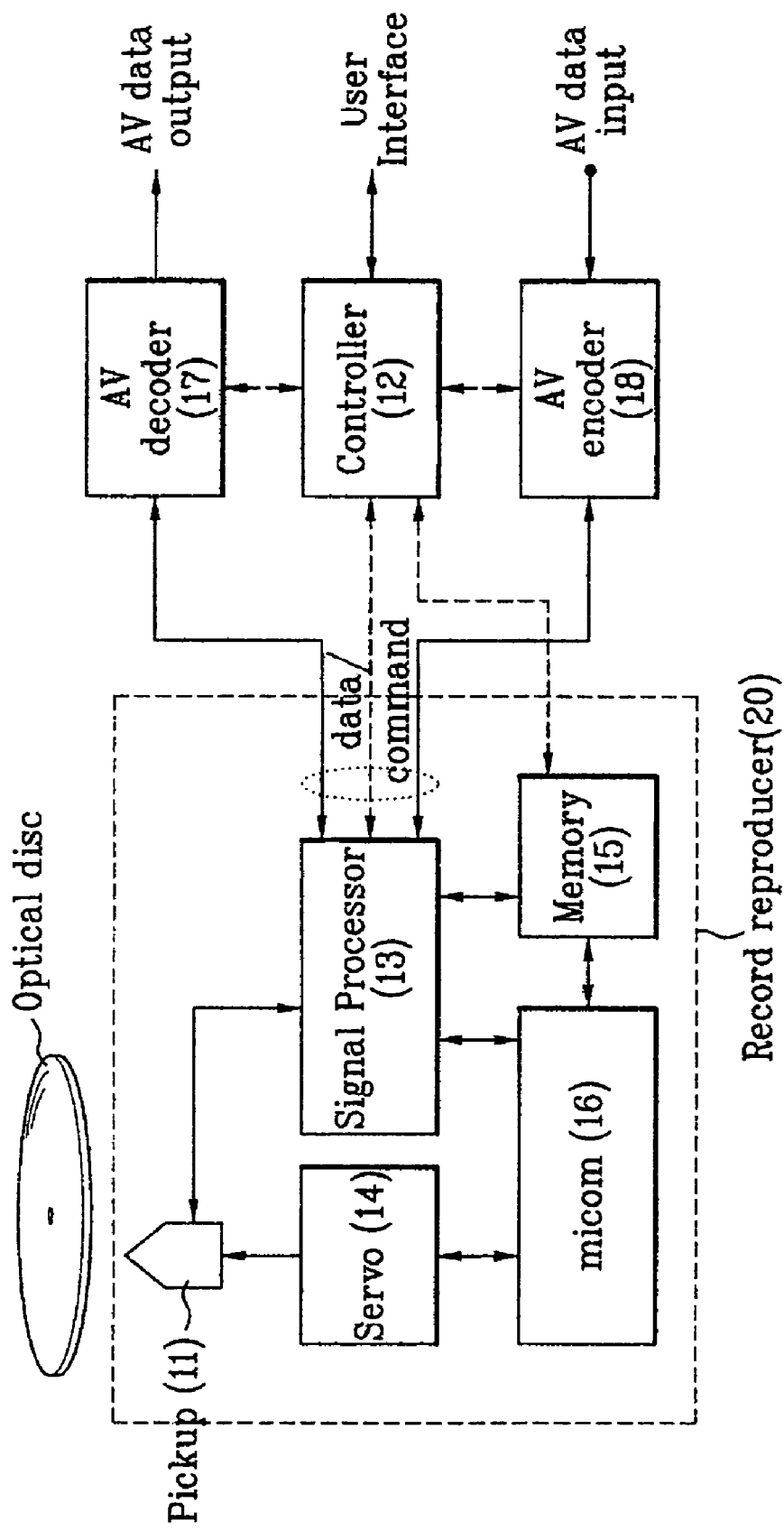
FIG. 9 illustrates a diagram showing an optical recording/reproducing apparatus in accordance with an embodiment of the present invention.

FIG. 9 illustrates an example embodiment of a optical recording/reproducing apparatus according to the present invention. As shown, the apparatus includes a pickup member 11 for retrieving or recording managing information having data and menu information recorded in the optical disc; a servo or driver 14 for controlling movement of the pickup member 11; a signal processor 13 for demodulating a reproduced signal received from the pickup member 11 into a desired signal value or modulating the signal to be recorded into a signal recorded in the optical disc; a memory 15 for temporarily storing the managing information having the menu information, and a microcomputer 16 for controlling the servo 14, the signal processor 13 and the memory 15. A comprehensive term of above structural elements is a record reproducer 20. Particularly, the record reproducer 20 performs reproduction based on the data structure as described above with respect to FIGS. 1-8C.

An AV decoder 17 provides the data to the user by decoding output data according to instruction from a controller 12. The AV encoder 18 converts an input signal into a specific format (i.e., MPEG2 transport stream) according to the control of the controller 12, and provides the converted signal to the signal processor 13 in the record reproducer 20 for performing the function of recoding the signal to the optical disc.

When the popup menu execution command (PopUp-on) is received through an interface of the user, the controller 12, as an element for controlling operation of the optical record reproducing apparatus, determines whether the performance of the popup menu is permitted and whether the background picture may be paused during the performance of the popup menu. These determinations are made by referring to the popup menu managing information temporarily stored in the memory 15 in accordance with the examples of the embodiments described above. The controller 12 then controls the record reproducer 20 and the AV decoder 17 in accordance with the determinations.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A optical recording medium storing an executable data structure for managing operation of a reproduction device, comprising:
    main video stream and graphic stream, the graphic stream including at least one menu information and graphic control information, the graphic control information selectively indicating one of to pause a display of the main video stream and to continue a display of the main video stream while the menu information is activated according to user request,
    wherein activation or deactivation of display of the menu information depends on the user request and, if the menu information is activated, pause or continuation of the main video stream is determined by the graphic control information of the graphic stream without user request, the graphic stream residing in a graphic stream file which is separate from the main video stream residing in a main video stream file.

2. The optical recording medium of claim 1, wherein the graphic stream further includes mask information indicating whether display of the menu information is forbidden.

3. The optical recording medium of claim 2, wherein the mask information is stored in a playlist file on the recording medium.

4. The optical recording medium of claim 3, wherein the mask information is stored in an application information playlist field of the playlist file.

5. The optical recording medium of claim 1, further comprising:
    a playitem, the playitem including navigation information for reproducing the graphic stream from a clip file.

6. The optical recording medium of claim 1 further comprising:
    a subplayitem stored in a playlist, and the subplayitem including navigation information for reproducing the graphic stream from a clip file.

7. The optical recording medium of claim 6, further comprising:
    a playitem stored in the playlist, and the playitem including navigation information for reproducing the main video stream from a clip file separate from the clip file having the graphic stream.

8. The optical recording medium of claim 1, wherein the menu information is information of a popup menu.

9. The optical recording medium of claim 1, wherein an author of the recording medium sets the graphic control information.

10. The optical recording medium of claim 1, wherein the menu information is comprised of one or more languages and a language of the menu information is changeable.

11. A method of reproducing, comprising:
    reading a main video stream and a graphic stream from a recording medium, the graphic stream including at least one menu information and graphic control information, the graphic control information selectively indicating one of to pause a display of the main video stream and to continue a display of main video stream while the menu information is activated; and
    displaying the main video stream in accordance with the graphic control information when the menu information is activated,
    wherein activation or deactivation of display of the menu information depends on user request and, if the menu information is activated, pause or continuation of the main video stream is determined by the graphic control information of the graphic stream without user request, the graphic stream residing in a graphic stream file which is separate from the main video stream residing in a main video stream file.

12. The method of claim 11, wherein the menu information is further stored in a playlist file or in a playitem.

13. The method of claim 11, wherein the menu information is information of a popup menu.

14. The method of claim 11, wherein an author of the recording medium sets the graphic control information.

15. The method of claim 11, wherein the menu information is comprised of one or more languages and a language of the menu information is changeable.

16. A method of recording a data structure on a recording medium, comprising:

recording a main video stream and a graphic stream on the recording medium, the graphic stream including at least one menu information and graphic control information, the graphic control information selectively indicating one of to pause a display of the main video stream and to continue a display of the main video stream while the menu information is activated according to user request, wherein activation or deactivation of display of the menu information depends on user request and, if menu information is activated, pause or continuation of the main video stream is determined by the graphic control information of the graphic stream without user request, the graphic stream residing in a graphic stream file which is separate from the main video stream residing in a main video stream file.

17. The method of claim 16, wherein the graphic stream further includes mask information indicating whether display of the menu information is forbidden.

18. The method of claim 17, wherein the mask information is further stored in a playlist file or in a playitem.

19. The method of claim 16, wherein the menu information is information of popup menu.

20. The method of claim 16, wherein an author of the recording medium sets the graphic control information.

21. The method of claim 16, wherein the menu information is comprised of one or more languages and a language of the menu information is changeable.

22. An apparatus for reproducing from a recording medium, comprising:

a reproducing device configured to reproduce information recorded on the recording medium;

a controller connected operatively to the reproducing device and configured to control the reproducing device to reproduce a main video stream and a graphic stream from a recording medium, the graphic stream including at least one menu information and graphic control information, the graphic control information selectively indicating one of to pause a display of the main video stream and to continue a display of main video stream while the menu information is activated, wherein activation or deactivation of display of the menu information depends on user request and, if the menu information is activated, pause or continuation of the main video stream is determined by the graphic control information of the graphic stream without user request, the graphic stream residing in a graphic stream file which is separate from the main video stream residing in a main video stream file.

23. The apparatus of claim 22, wherein the graphic stream further including mask information indicating whether display of the menu information is forbidden.

24. The apparatus of claim 23, wherein the mask information is stored in a playlist file or in a playitem.

25. The apparatus of claim 22, wherein, the menu information is a popup menu.

26. The apparatus of claim 22, wherein an author of the recording medium sets the graphic control information.

27. The apparatus of claim 22, wherein the menu information is comprised of one or more languages and a language of the menu information is changeable.

28. An apparatus for recording a data structure, comprising:

a recording device configured to record on a recording medium;

a controller configured to control the recording device to record a main video stream and a graphic stream from a recording medium, the graphic stream including at least one menu information and graphic control information, the graphic control information selectively indicating one of to pause a display of the main video stream and to continue a display of main video stream while the menu information is activated, wherein activation or deactivation of display of the menu information depends on user request and, if the menu information is activated, pause or continuation of the main video stream is determined by the graphic control information of the graphic stream without user request, the graphic stream residing in a graphic stream file which is separate from the main video stream residing in a main video stream file.

29. The apparatus of claim 28, wherein the graphic stream further includes mask information indicating whether display of the menu information is forbidden.

30. The apparatus of claim 29, wherein the controller is configured to control the recording device to record the mask information in a playlist file or in a playitem.

31. The apparatus of claim 28, wherein the menu information is a popup menu.

32. The apparatus of claim 28, wherein the controller is configured to set the graphic control information as determined by an author.

33. The apparatus of claim 28, wherein the menu information is comprised of one or more languages and a language of the menu information is changeable.

* * * * *